(12) United States Patent
Schumacher

(10) Patent No.: US 8,082,812 B2
(45) Date of Patent: Dec. 27, 2011

(54) CLOSURE SYSTEM FOR VEHICLES

(75) Inventor: Thorsten Schumacher, Kummerfeld (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 846 days.

(21) Appl. No.: 12/166,735

(22) Filed: Jul. 2, 2008

(65) Prior Publication Data

US 2009/0007707 A1     Jan. 8, 2009

(30) Foreign Application Priority Data

Jul. 3, 2007  (DE) .......................... 10 2007 030 851

(51) Int. Cl.
*F16H 27/02*   (2006.01)
(52) U.S. Cl. ..................................... 74/89.12
(58) Field of Classification Search ....... 74/89.12–89.17
See application file for complete search history.

(56) References Cited

U.S. PATENT DOCUMENTS

| | | | |
|---|---|---|---|
| 823,341 A | 6/1906 | Livingston | |
| 1,213,800 A * | 1/1917 | Piper | 254/294 |
| 4,852,419 A * | 8/1989 | Kittel et al. | 74/89.14 |
| 4,919,005 A | 4/1990 | Schleicher | |
| 5,020,850 A * | 6/1991 | Bienert et al. | 296/223 |
| 6,283,392 B1 | 9/2001 | Stiner | |
| 6,598,929 B2 * | 7/2003 | Schlecht et al. | 296/97.4 |
| 7,316,443 B2 * | 1/2008 | Schlecht | 296/97.8 |
| 7,377,529 B2 * | 5/2008 | Green | 280/124.107 |
| 2006/0113740 A1 | 6/2006 | Green | |
| 2006/0290162 A1 | 12/2006 | Schlecht | |

FOREIGN PATENT DOCUMENTS

| | | |
|---|---|---|
| DE | 19538798 A1 | 4/1997 |
| DE | 112005003093 T5 | 10/2007 |
| EP | 1736335 A2 | 12/2006 |

\* cited by examiner

*Primary Examiner* — Raymond Addie
(74) *Attorney, Agent, or Firm* — Brooks Kushman P.C.

(57) ABSTRACT

A closure system for a motor vehicle includes a pinion and a pair of U-shaped, flat sliders. The pinion is engaged to a drive shaft to rotate in a first rotational direction and an opposite second rotational direction in response to the drive shaft rotating. Each slider has an inner leg and an outer leg connected at one end to a bridge. The inner surface of each inner leg includes a gear rack. The inner surfaces of the inner legs face one another and surround opposite sides of the pinion such that corresponding portions of the gear racks engage the respective opposite sides of the pinion whereby the sliders are longitudinally displaced away from one another in response to the pinion rotating in the first rotational direction and are longitudinally displaced toward one another in response to the pinion rotating in the second rotational direction.

19 Claims, 3 Drawing Sheets

CLOSURE SYSTEM FOR VEHICLES

CROSS-REFERENCE TO RELATED APPLICATIONS

This application claims foreign priority benefits under 35 U.S.C. §119(a)-(d) to DE 10 2007 030 851.7, filed Jul. 3, 2007, which is hereby incorporated by reference in its entirety.

BACKGROUND OF THE INVENTION

1. Field of the Invention

The present invention relates to a vehicular closure system having a pinion driven by a motor accommodated in a closure housing and having a slider provided with toothing by which the pinion is displaced in the longitudinal direction of the slider.

2. Background Art

Such a closure system has a gear system which includes guide rod mechanisms for locking the gear system. Transmission to the actual locking element occurs via members such as pipes, rods, Bowden cables, and pressure-resistant drive cables. The latter are frequently found in sliding roof actuators and convert a rotational motion to a translation motion via a drive pinion.

DE 38 09 949 A1 (corresponding to U.S. Pat. No. 4,919,005) describes a drive mechanism for a movable element on a vehicle body. The drive mechanism includes a pressure-resistant, axially movably drive cable which is displaced in an axial direction by a drive pinion. The rotational motion of the pinion is converted to an axial direction of motion by toothing on a spiral surrounding the cable. The cable is led through tubular guides. In the region of the pinion, a support element supports the motion to be transmitted from the pinion to the cable. The support element is U-shaped with a particular approach angle. Surfaces in the region of the legs of the support element are to achieve reliable, quiet operation. The entire unit is also accommodated in a separate housing.

DE 38 32 681 C1 (corresponding to U.S. Pat. No. 5,020,850) describes a closure unit for actuating a sliding or tilting roof. A drive pinion actuates the roof using a pressure-resistant drive cable led through guide tubes. For this purpose, the cable together with its guide tubes and the pinion are extrusion coated and enclosed by a plastic housing. This extrusion-coated element is also designed as a receptacle for the pinion. Here as well, a translation motion is generated from a rotational motion. The pinion meshes with the spiral of the cable, the cable has to be supported by the guide tubes in the engagement region, and the housing forms the extrusion-coated element.

SUMMARY OF THE INVENTION

An object of the present invention includes an economical closure system, which represents a particularly flat, easily installed unit, with the actuating forces on the closure system being in equilibrium with one another.

In carrying out the above object and other objects, the present invention provides a vehicular closure system having a pinion and a pair of U-shaped, flat sliders. The pinion is engaged to a drive shaft to rotate in a first rotational direction and an opposite second rotational direction in response to the drive shaft rotating in the first rotational direction and the opposite second rotational direction. Each slider has an inner leg and an outer leg connected at one end to a bridge. The inner surface of each inner leg includes a gear rack. The inner surfaces of the inner legs face one another and surround opposite sides of the pinion such that corresponding portions of the gear racks engage the respective opposite sides of the pinion whereby the sliders are longitudinally displaced away from one another in response to the pinion rotating in the first rotational direction and are longitudinally displaced toward one another in response to the pinion rotating in the second rotational direction.

Also, in carrying out the above object and other objects, the present invention provides another vehicular closure system. This system includes a housing, a cover, a motor in the housing, a drive shaft, a pinion, and a pair of sliders. The housing has an axially extending opening on a bottom side which extends in a longitudinal plane. The cover has an axially extending opening on a top side which extends in a longitudinal plane. The cover is connected to the bottom side of the housing with the openings being in alignment. The drive shaft is connected to the motor to rotate in a first rotational direction and an opposite second rotational direction in response to being driven by the motor. The drive shaft axially extends through the opening of the housing. The pinion axially extends in the openings of the housing and the cover. The pinion is engaged to the drive shaft such that the pinion rotates in correspondence with the drive shaft. The sliders extend in a longitudinal plane between the bottom side of the housing and the top side of the cover. Each slider is a U-shaped, flat slider having an inner leg and an outer leg connected at one end to a bridge. The inner surface of each inner leg includes a gear rack. The inner surfaces of the inner legs face one another and surround opposite sides of the pinion such that corresponding portions of the gear racks engage the respective opposite sides of the pinion whereby the sliders are longitudinally displaced away from one another in response to the pinion rotating in the first rotational direction and are longitudinally displaced toward one another in response to the pinion rotating in the second rotational direction.

A closure system in accordance with embodiments of the present invention employs a surrounding slider system having a very flat design with maximum transmission of force. The transmission of large actuating forces requires a solid support of the actuators with minimal play, which is achieved by the surrounding slider system.

The slider system of the closure system includes two U-shaped flat sliders. Each slider includes a pair of U-shaped legs. Each pair of U-shaped legs includes an inner leg and an outer leg. The two sliders are positioned such that the inner side of the inner leg of one slider is guided in a sliding manner on the outer leg of the other slider. The inner legs of the sliders each have a gear rack on their inner sides. The gear racks mesh with a centrally located pinion on opposite sides of the pinion. When the pinion rotates in a first direction, the sliders move away from one another while being inside one another. When the pinion rotates in the opposite second direction, the sliders move toward one another while being inside one another. The mutually engaging legs of the sliders together with the pinion, which is continually meshed with the gear racks, result in a self-contained slider system which mutually supports forces.

The slider system is accommodated in a closure housing. Guides situated in the closure housing are used to only ensure reliable guiding and sliding of the sliders such that the guides are not required to support larger forces.

The closure system may be installed in a roof element. For transmission of the closing motion, a transmission element such as a rod assembly is between the closure system and closure elements such as closure hooks. The closure system is also suitable for installation in other regions of a vehicle. Instead of a rod assembly, Bowden cables may be used for the transmission.

Stops may be provided inside the closure unit by virtue of the lengths of the legs of the sliders of the slider system. When the sliders are brought together, the ends of each leg abut against an inner wall of the closure housing. In addition, the ends of the legs may be prevented from further translation motion by the bridge of each pair of legs of each slider. It is also possible that when the ends of the legs with the gear racks reach the pinion further displacement is prevented because the racks do not extend any further. The ends of the legs may have projections which in the manner of stops face the respective opposing gear racks. In this case, the projections abut against the pinion when the sliders are correspondingly displaced thereby preventing further sliding of the sliders.

In an embodiment, the closure housing is open on one side and only one slider emerges from this side of the closure housing. In this case, the second flat slider is designed without a mounting used for attaching transmission elements or actuators. The second slider moves in the same way as described except that it is displaced and guided strictly within the closure housing.

As the closure system uses a (closed) slider system which mutually supports forces and as the forces can be transmitted only in the longitudinal direction of the sliders, the closure housing and a housing cover may be made of plastic. Lateral guides provided inside the closure housing may have small dimensions as only small forces need be supported. The lateral guides are provided to pretension the sliders if desired.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
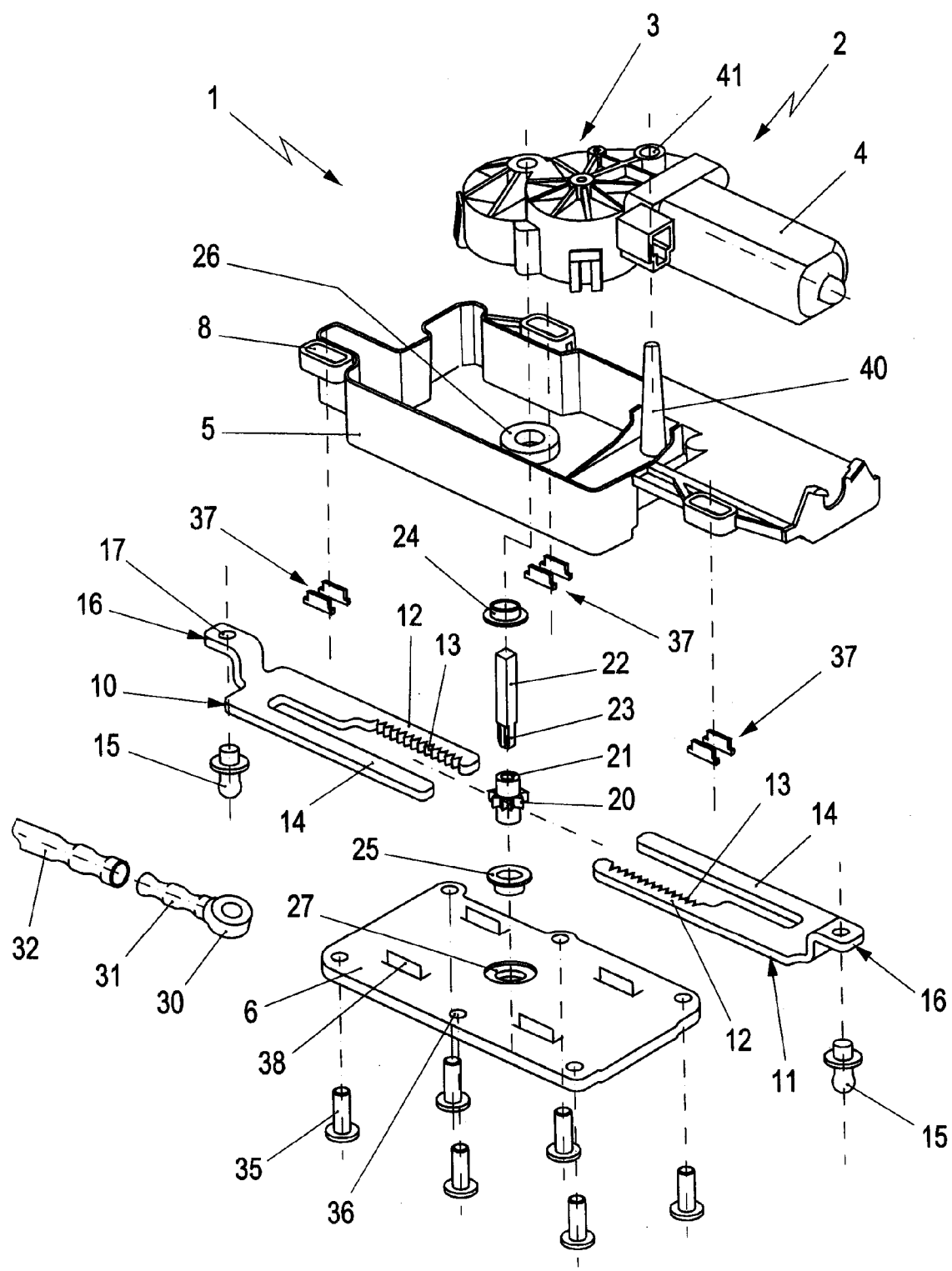
FIG. 1 illustrates an exploded view of a closure system in accordance with an embodiment of the present invention.
Figure 2:
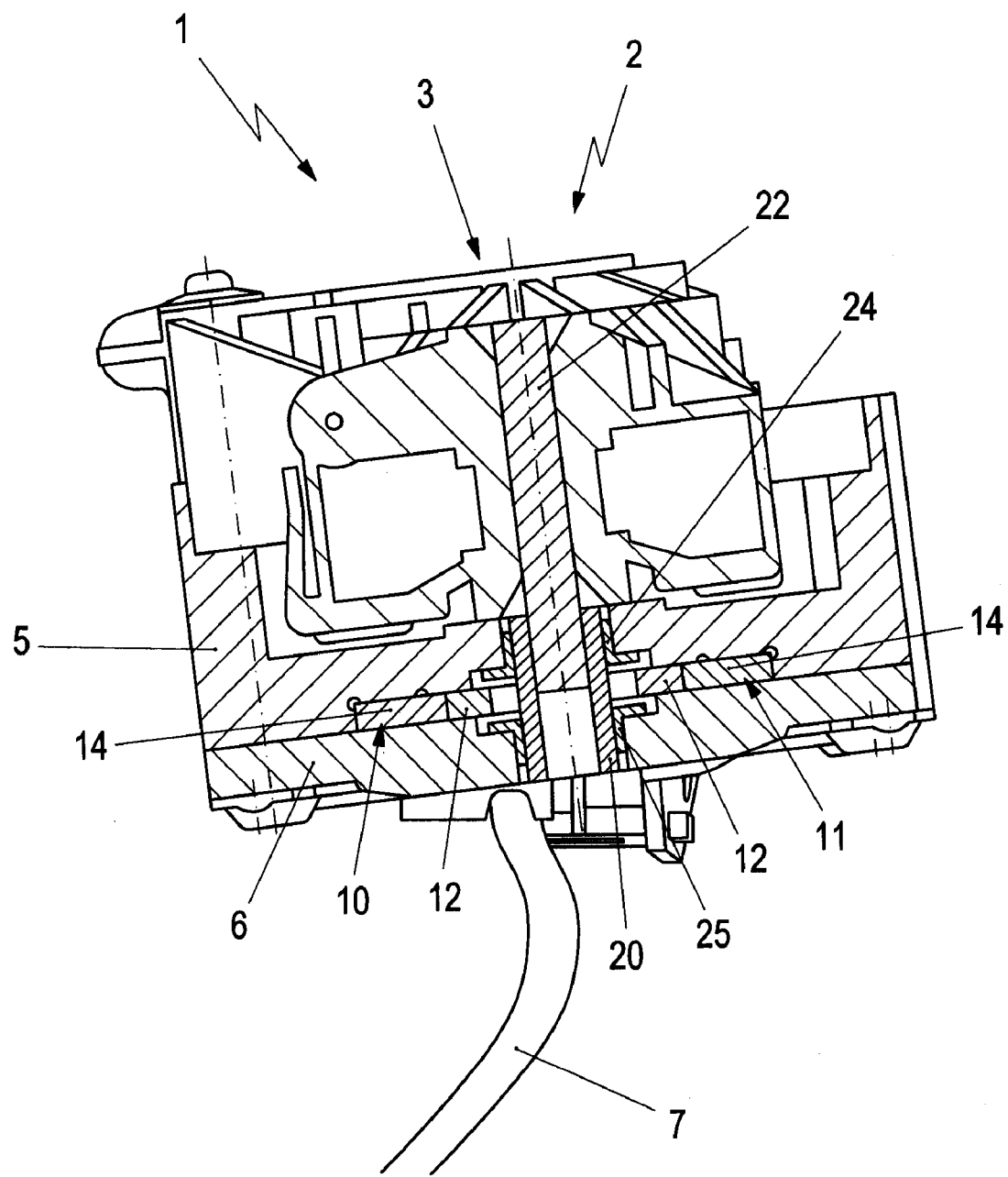
FIG. 2 illustrates a cross-sectional view of the closure system.
Figure 3:
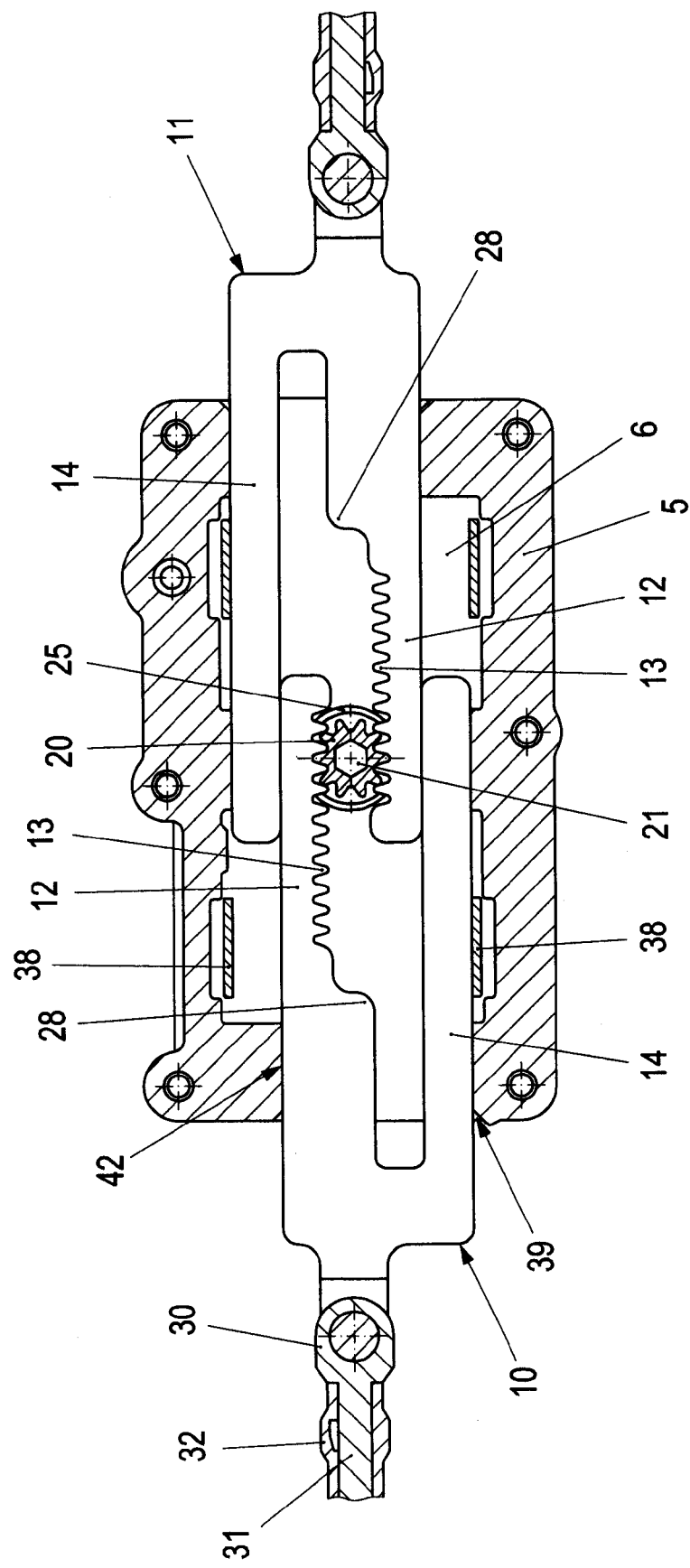
FIG. 3 illustrates a sectional view of the closure system.

Referring now to FIGS. 1, 2, and 3, views of a closure system 1 in accordance with an embodiment of the present invention are shown. Closure system 1 includes a drive unit 2, a closure housing 5, and a housing cover 6. Drive unit 2 includes a gearing 3 such as a bevel gearing and an electric motor 4. Gearing 3 and motor 4 are used to drive closure system 1 between a closed state and an opened state.

Drive unit 2 fits in closure housing 5. For accurate positioning of drive unit 2 in closure housing 5, drive unit 2 includes a location hole 41 and closure housing 5 includes an alignment pin 40. Drive unit 2 fits in closure housing 5 by pushing location hole 41 onto alignment pin 40. In the installed state of closure system 1 (shown in FIGS. 2 and 3), gearing 3 is positioned in flush alignment above the opening in closure housing 5. On the side of closure housing 5 opposite from gearing 3 this opening has an upper bearing receptacle 26 into which an upper bearing bush 24 is introduced.

Housing cover 6 fixedly closes closure housing 5. To this end, screws 35 extending through boreholes 36 of housing cover 6 fixedly attach housing cover 6 to closure housing 5. Proceeding from closure housing 5, a lower bearing bush 25 is introduced into a lower bearing receptacle 27 in housing cover 6 in flush contact with upper bearing bush 24.

In the installed state of closure system 1, the axial displacement of pinion 20 is accommodated and supported on both sides in bearing bushes 24, 25. For this purpose, bearing bushes 24, 25 may be made of a slide bearing material such as brass or a plastic that is suitable for a slide bearing. Pinion 20 is guided via its lateral tooth surfaces in an axial direction on the flange faces of bearing bushes 24, 25.

On the side facing drive unit 2, in its axial extension, pinion 20 has a hexagonal socket 21, which extends over the entire axial dimension of pinion 20. Socket 21 accommodates a hexagonal insert pin 23 of a drive shaft 22. Drive shaft 22 connects the driven gear of gearing 3 to pinion 20 whereby pinion 20 is driven to rotate as drive shaft 22 rotates in response to being driven by motor 4.

The teeth of pinion 20 mesh with two parallel gear racks 13 of two U-shaped flat sliders 10, 11. Each slider 10, 11 includes a first leg 12 and a second leg 14. First and second legs 12, 14 of each slider 10, 11 form a U-shape and are oppositely situated from one another. Gear racks 13 are respectively situated on the inner side of oppositely situated first legs 12. Pinion 20 is located in the middle of legs 12, 14 between gear racks 13 on first legs 12. Gear racks 13 with legs 12 and legs 14 mutually support one another such that compensation is provided for forces occurring transverse to legs 12, 14.

Each slider 10, 11 includes a respective mounting 16. Mountings 16 are provided at the connecting bridge of the two U-shaped legs 12, 14 of respective sliders 10, 11. Mountings 16 are bent in the shape of a right angle with the bend being provided in the direction of drive unit 2. Mountings 16 are positioned off-center with respect to the longitudinal extension of sliders 10, 11, on the bridges thereof. Each mounting 16 has a borehole 17 for accommodating a cylindrical flange of a ball-and-socket pin 15. Ball-and-socket heads 30 are respectively situated on ball-and-socket pins 15. Each ball-and-socket head 30 together with its respective ball-and-socket pin 15 is held in position by a securing element. Each ball-and-socket head 30 has a taper on one side of its outer diameter which reduces the outer diameter.

Each ball-and-socket head 30 includes a cylindrical shaft 31. Push-pull rods 32 are pushed onto respective shafts 31 for transmission of closing and opening motions. Push-pull rod 32 include respective tubes in the regions of tapers of shafts 31 and the tubes are deformed into these tapers. In this manner, a durable, form-fit connection is established between ball-and-head socket heads 30 and push-pull rods 32.

On its open side, closure housing 5 is tightly closed by housing cover 6. To this end, screws 35 project through boreholes 36 in housing cover 6. In a central location, lower bearing bush 25 is introduced into lower bearing receptacle 27 in housing cover 6. In addition, lateral guides 38 project from housing cover 6 and into closure housing 5. Lateral guides 38 are used for guiding and fixing sliders 10, 11 during the opening and closing processes of closure system 1. Lateral guides 38 may be integrally molded in one piece with housing cover 6 or may be fitted as a separate component in corresponding location holes in housing cover 6.

For accommodating the installed state of closure system 1, support plates 37 are inserted into fastening openings 8 in closure housing 5. Support plates 37 are beneficial when closure housing 5 is made of plastic as support plates 37 prevent deformation of damage to the walls of fastening openings 8 when closure housing 5 is screwed down. In addition, the dimensioning of support plates 37 helps maintain the installation distance between the fasteners and allows defined screwing forces.

FIG. 2 illustrates a cross-sectional view of closure system 1 in its installed state. Sliders 10, 11 are mounted between closure housing 5 and housing cover 6. Gear racks 13 of sliders 10, 11 are engaged with pinion 20. At its upper cylindrical extension, pinion 20 is guided in upper bearing bush 24. At its lower cylindrical extension, pinion 20 is guided in lower bearing bush 25. Drive shaft 22 projects into pinion 20, in the form of a connecting element between pinion 20 and drive unit 2, until drive shaft 22 reaches an approximately central position in pinion 20.

The free region of socket 21 of pinion 20 opposite drive shaft 22 is connected to the outer region via the opening in lower bearing receptacle 27. A crank 7 having a hexagonal insert pin may be introduced through this opening as needed, thus opening and closing pinion 20 and the entire closure system 1 by hand. This is the case when there is insufficient power for motor 4 as the hand actuation represents an emergency locking/unlocking, i.e., manual unlocking procedure.

Independent displacement of sliders 10, 11 is prevented as gear racks 13 are self-locking. Closure system 1 is thus protected and cannot be accidentally opened such as by vibration.

FIG. 3 illustrates a view of sliders 10, 11 in the extended slide position. In this position, closure system 1, between a roof and an upper frame of a windshield, for example, is closed and locked. In order to open and unlock closure system 1, sliders 10, 11 are pushed together by rotating pinion 20. As a result of the displacement, push-pull rods 32 articulately attached to mountings 16 are moved. At their sides opposite from closure system 1, push-pull rods 32 are connected to closure elements used for locking the roof.

Mountings 16 are offset on the bridge side of sliders 10, 11 toward the side of gear racks 13. In the installed position of closure system 1, mountings 16 are in flush alignment in the same longitudinal plane as pinion 20 so that the effect of the pulling and pushing motion may be introduced into push-pull rods 32 with neutral lateral force.

Legs 12, 14 of each slider 10, 11 are essentially the same width. Legs 12 each have toothing on their sides facing the opposite legs 14. Each leg 12 is designed at least partially as a gear rack 13 with the length of the toothing depending on the displacement motion of push-pull rods 32.

As described, sliders 10, 11 are intermeshed with gear racks 13 being continually meshed with pinion 20. The back side of each leg 12 of a slider 10, 11 rests on the respective inner side of the straight leg 14 of the other slider 10, 11. This configuration reliably and permanently prevents gear racks 13 from lifting off of pinion 20. Each leg 12 with its gear rack 13 is thus clamped and guided between pinion 20 and the straight leg 14 of the other slider 10, 11.

The system of these intermeshed U-shaped legs 12, 14 represents a closed system in terms of force. If a gear rack 13 has a tendency to lift off from pinion 20 on one side of pinion 20, at its back side the gear rack 13 is supported on the inner side of leg 14 of the other slider 10, 11. In turn, leg 14 of the other slider 10, 11 is supported on pinion 20 by the bridge of slider 10, 11 and gear rack 13 for this slider 10, 11. As described, sliders 10, 11 are identical U-shaped flat sliders for forming a closure element and extend into one another and support one another in a mirror image type assembly.

In the mutual contact regions of sliders 10, 11 (i.e., back side of gear racks 13 and the inner side of legs 14) legs 12, 14 are supported and mutually guided. Additional guides are provided for sliders 10, 11 in the passage regions of housing openings 39, 42 and in the middle position of closure housing 5 in the region of pinion 20. The extensions of these guides are dimensioned so that lateral tipping of sliders 10, 11 is reliably prevented. In addition, in the regions between the center guides and the guides in housing openings 39 lateral guides 38 for sliders 10, 11 are mounted to the inner side of housing cover 6. Lateral guides 38, among other things, allow sliders 10, 11 to be positioned with respect to one another during installation and to be held against housing cover 6. Lateral guides 38 project from housing cover 6 in the form of narrow bridges, and by corresponding tilting in the direction of sliders 10, 11 may exert transverse forces on sliders 10, 11 in the manner of a leaf spring. In addition, these transverse forces pretension sliders 10, 11 with respect to one another, thereby avoiding possible rattling noises and allowing tolerances of sliders 10, 11, pinion 20, and/or closure housing 5 to be compensated.

The end of each gear rack 13 is designed as a short, flat region corresponding to the width of gear rack 13. In the immediate vicinity of the bridges of sliders 10, 11, the U-shaped cavity between legs 12, 14 is adapted to the width of gear racks 13. When sliders 10, 11 are almost completely pushed together, the ends of sliders 10, 11 are accommodated in these U-shaped cavities, and sliders 10, 11 are thus also mutually guided and supported. When sliders 10, 11 are completely pushed together, the end of a leg 12 with gear rack 13 is able to abut against the bridge of the oppositely situated slider 10, 11, thereby forming a stop between the two sliders 10, 11.

Leg 12 with gear rack 13 has a widened design on the side facing the bridge of leg 12 in an approximately central position. This widening has a step-shaped design and has different radii in a transition regions 28. The geometric shape of step-shaped transition region 28 may be designed such that when sliders 10, 11 are pushed together transition regions 28 come to rest against pinion 20 in the manner of stops. Transition region 28 may be adapted to the cylindrical shape of pinion 20.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A vehicular closure system comprising:
a housing having an axially extending opening on a bottom side which extends in a longitudinal plane;
a cover having an axially extending opening on a top side which extends in a longitudinal plane, wherein the cover is connected to the bottom side of the housing with the openings being in alignment;
a motor in the housing;
a drive shaft connected to the motor to rotate in a first rotational direction and an opposite second rotational direction in response to being driven by the motor, wherein the drive shaft axially extends through the opening of the housing;
a pinion axially extending in the openings of the housing and the cover, wherein the pinion is engaged to the drive shaft such that the pinion rotates in correspondence with the drive shaft;
a pair of sliders extending in a longitudinal plane between the bottom side of the housing and the top side of the cover, wherein each slider is a U-shaped, flat slider having an inner leg and an outer leg connected at one end to a bridge, wherein the inner surface of each inner leg includes a gear rack, wherein the inner surfaces of the inner legs face one another and surround opposite sides of the pinion such that corresponding portions of the gear racks engage the respective opposite sides of the pinion whereby the sliders are longitudinally displaced away from one another in response to the pinion rotating in the first rotational direction and are longitudinally displaced toward one another in response to the pinion rotating in the second rotational direction, wherein the inner surface of the outer leg of each slider rests on and is guided in a sliding manner on the outer surface of the inner leg of the other slider such that the inner leg of each slider is clamped and guided between the pinion and the outer leg of the other slider.

2. The system of claim 1 wherein:
each gear rack includes toothing.

3. The system of claim 1 wherein:
the inner leg of each slider has the same width as the outer leg of the slider.

4. The system of claim 1 wherein:
the inner leg of each slider has a widened region which extends in a central location until reaching the bridge of the slider.

5. The system of claim 4 wherein:
the interior space between the outer leg of each slider and the widened region of the inner leg of the slider has the same width as the outer leg.

6. The system of claim 4 wherein:
the inner leg of each slider has a step-shaped transition region up to the widened region of inner the leg.

7. The system of claim 6 wherein:
the step-shaped transition regions act as a stop between the sliders and the pinion when the flat sliders are moved toward one another.

8. The system of claim 1 wherein:
the bridge of the each slider acts as a stop for the inner leg of the slider.

9. The system of claim 1 wherein:
at least one of the sliders includes a mounting connected to the bridge of the slider.

10. The system of claim 9 wherein:
the mounting is attached to a ball-and-socket pin.

11. The system of claim 1 wherein:
the sliders are guided in housing openings in a central location of the housing.

12. The system of claim 1 wherein:
the sliders are guided by flat lateral guides which exert pressure on the outer legs.

13. The system of claim 12 wherein:
the lateral guides are accommodated in openings in the cover.

14. The system of claim 12 wherein:
the lateral guides are connected integrally to the cover.

15. The system of claim 1 wherein:
the gear racks of the inner legs of the sliders continually mesh with the pinion.

16. The system of claim 1 wherein:
the pinion includes an externally accessible socket to which the drive shaft engages.

17. The system of claim 1 wherein:
the pinion is rotatably supported in bearing bushes.

18. A vehicular closure system comprising:
a drive shaft connected to a motor to rotate in a first rotational direction and an opposite second rotational direction in response to being driven by the motor;
a pinion engaged to the drive shaft such that the pinion rotates in correspondence with the drive shaft; and
a pair of U-shaped, flat sliders each having an inner leg and an outer leg connected at one end to a bridge, wherein the inner surface of each inner leg includes a gear rack, wherein the inner surfaces of the inner legs face one another and surround opposite sides of the pinion such that corresponding portions of the gear racks engage the respective opposite sides of the pinion whereby the sliders are longitudinally displaced away from one another in response to the pinion rotating in the first rotational direction and are longitudinally displaced toward one another in response to the pinion rotating in the second rotational direction, wherein the inner surface of the outer leg of each slider rests on and is guided in a sliding manner on the outer surface of the inner leg of the other slider such that the inner leg of each slider is clamped and guided between the pinion and the outer leg of the other slider.

19. A vehicular closure system comprising:
a pinion engaged to a drive shaft to rotate in a first rotational direction and an opposite second rotational direction in response to the drive shaft rotating in the first rotational direction and the opposite second rotational direction; and
a pair of U-shaped, flat sliders each having an inner leg and an outer leg connected at one end to a bridge, wherein the inner surface of each inner leg includes a gear rack, wherein the inner surfaces of the inner legs face one another and surround opposite sides of the pinion such that corresponding portions of the gear racks engage the respective opposite sides of the pinion whereby the sliders are longitudinally displaced away from one another in response to the pinion rotating in the first rotational direction and are longitudinally displaced toward one another in response to the pinion rotating in the second rotational direction, wherein the inner surface of the outer leg of each slider rests on and is guided in a sliding manner on the outer surface of the inner leg of the other slider such that the inner leg of each slider is clamped and guided between the pinion and the outer leg of the other slider.

* * * * *